United States Patent
Inoshita et al.

(10) Patent No.: US 10,977,937 B2
(45) Date of Patent: Apr. 13, 2021

(54) PARKING LOT GUIDANCE DEVICE

(71) Applicant: TOYOTA JIDOSHA KABUSHIKI KAISHA, Toyota (JP)

(72) Inventors: Takeshi Inoshita, Kashiwa (JP); Ryotaro Fujiwara, Tokyo (JP); Ko Koga, Tokyo (JP); Daisuke Furukawa, Chofu (JP); Ryota Okubi, Funabashi (JP); Toshiyuki Hagiya, Shiki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/527,321

(22) Filed: Jul. 31, 2019

(65) Prior Publication Data

US 2020/0105136 A1   Apr. 2, 2020

(30) Foreign Application Priority Data

Oct. 2, 2018   (JP) .............................. JP2018-187732

(51) Int. Cl.
| | |
|---|---|
| *G08G 1/065* | (2006.01) |
| *H04W 4/46* | (2018.01) |
| *G08G 1/0968* | (2006.01) |
| *G08G 1/133* | (2006.01) |
| *G08G 1/14* | (2006.01) |
| *G07B 15/02* | (2011.01) |

(52) U.S. Cl.
CPC ........... *G08G 1/065* (2013.01); *G08G 1/0968* (2013.01); *G08G 1/133* (2013.01); *H04W 4/46* (2018.02)

(58) Field of Classification Search
CPC ...................................................... G08G 1/065
See application file for complete search history.

(56) References Cited

U.S. PATENT DOCUMENTS

| | | | | |
|---|---|---|---|---|
| 2016/0180261 | A1* | 6/2016 | Rosen ................... | G06Q 10/02 705/5 |
| 2017/0117628 | A1* | 4/2017 | Banasky ................. | H01Q 3/34 |
| 2017/0320490 | A1* | 11/2017 | Yuan ..................... | B60W 30/06 |
| 2018/0118100 | A1* | 5/2018 | Kjaer-Lohse .......... | B60Q 1/346 |
| 2018/0255525 | A1* | 9/2018 | Uchiyama ........... | H04W 56/0015 |

FOREIGN PATENT DOCUMENTS

| | | | | |
|---|---|---|---|---|
| JP | 2012-108599 | * | 11/2010 | ............... G08G 1/14 |
| JP | 2012-108599 | A | 6/2012 | |

\* cited by examiner

*Primary Examiner* — Emily C Terrell
*Assistant Examiner* — Pameshanand Mahase
(74) *Attorney, Agent, or Firm* — Sughrue Mion, PLLC

(57) ABSTRACT

A parking lot guidance device includes a processor. The processor is configured to cause a communication unit to transmit exit information to a vehicle with the highest priority among other vehicles that are transmission targets. The exit information includes information of a size of a parking section in which a host vehicle is parked, information of a position of the parking section in which the host vehicle is parked, and information of a start of exit of the host vehicle.

7 Claims, 5 Drawing Sheets

PARKING LOT GUIDANCE DEVICE

INCORPORATION BY REFERENCE

The disclosure of Japanese Patent Application No. 2018-187732 filed on Oct. 2, 2018 including the specification, drawings and abstract is incorporated herein by reference in its entirety.

BACKGROUND

1. Technical Field

The disclosure relates to a parking lot guidance device that performs inter-vehicle communication to give notice of information on a parking section in which exit of a vehicle is scheduled.

2. Description of Related Art

In parking lot guidance devices such as a navigation device, a technique for notifying a driver of information on an easy-to-use parking section in a parking lot facility is known (refer to, for example, Japanese Unexamined Patent Application Publication No. 2012-108599 (JP 2012-108599 A)). In this technique, a driver is notified of an area of a vacant parking section with a display pattern according to an evaluation value indicating convenience calculated for each vacant parking section in the parking lot facility.

SUMMARY

However, in JP 2012-108599 A described above, the driver is merely notified of the area of a vacant parking section with the display pattern according to the evaluation value. In the vacant parking section, there is a case where the area of the parking section becomes small due to a vehicle or an obstacle adjacent thereto. For this reason, in JP 2012-108599 A described above, the driver cannot grasp the size of each current parking section in advance, and therefore, even though a vehicle goes to a vacant parking section according to the notification from the parking lot guidance device, there is a case where it is not possible to park the host vehicle in the vacant parking section.

The disclosure provides a parking lot guidance device with which it is possible to grasp in advance the size of a parking section to be parked.

An aspect of the disclosure relates to a parking lot guidance device including a processor. The processor is configured to cause a communication unit to transmit exit information to a vehicle with a highest priority among other vehicles that are transmission targets. The exit information includes information of a size of a parking section in which a host vehicle is parked, information of a position of the parking section in which the host vehicle is parked, and information of a start of exit of the host vehicle.

In the parking lot guidance device according to the aspect of the disclosure, the processor may be configured to calculate the size of the parking section, based on a distance to an obstacle adjacent to the host vehicle.

According to the aspect of the disclosure, the processor calculates the size of the parking section in which the host vehicle has been parked, based on the distance to an obstacle adjacent to the host vehicle, and therefore, when transmission is made to a vehicle with the highest priority among transmission targets, it is possible to cause the driver to grasp the actual size of the parking section.

In the parking lot guidance device according to the aspect of the disclosure, the processor may be configured to, in a case where the processor receives the exit information from another vehicle, transmit the exit information received from the other vehicle to a vehicle with next priority among the other vehicles that are transmission targets, when an instruction signal to adopt the exit information is not input.

According to the aspect of the disclosure, in a case where the processor receives the exit information from another vehicle, when an instruction signal to adopt the exit information is not input, the processor transmits the exit information received from the other vehicle to a vehicle with next priority among transmission targets through the inter-vehicle communication, and therefore, it is possible to perform transmission between the vehicles in a sequential relay format with the inter-vehicle communication until the exit information is adopted.

In the parking lot guidance device according to the aspect of the disclosure, the processor may be configured to cause a display device to display the exit information received from the other vehicle, in a case where the processor receives the exit information from the other vehicle.

According to the aspect of the disclosure, in a case where the processor receives the exit information from the other vehicle, the processor displays the exit information received from the other vehicle, and therefore, the driver can intuitively determine whether or not it is possible to perform parking in a vacant parking section.

According to the aspect of the disclosure, the exit information that includes the size of the parking section in which the host vehicle has been parked, the position information on the position of the parking section in which the host vehicle has been parked, and the start of exit of the host vehicle is transmitted to a vehicle with the highest priority among transmission targets, and therefore, the effect of being capable of grasping in advance the size of the parking section to be parked is exhibited.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
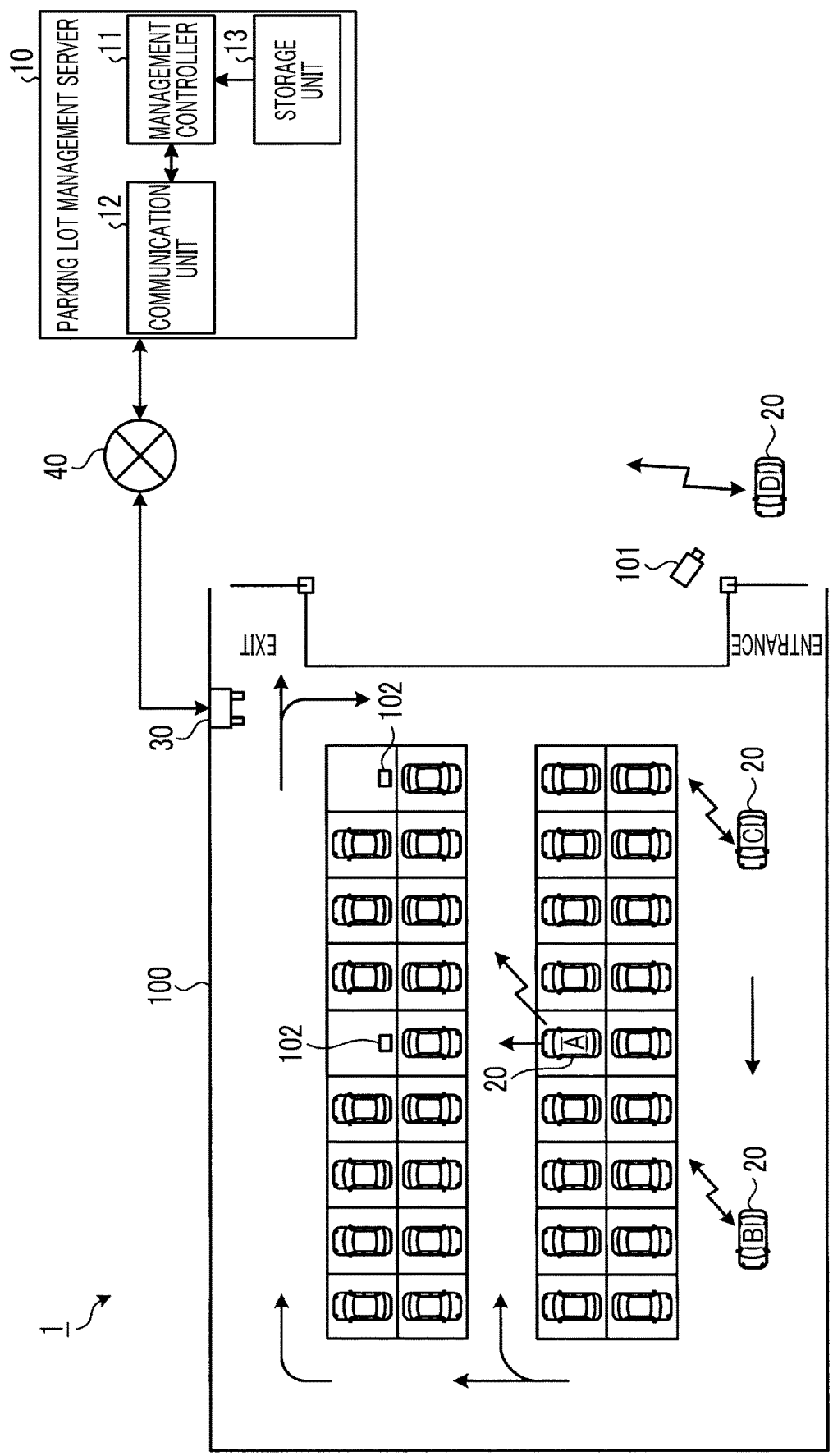
FIG. 1 is a schematic diagram showing a schematic configuration of a parking lot support system according to an embodiment.

Hereinafter, an embodiment for carrying out the disclosure will be described in detail with reference to the drawings. The disclosure is not limited by the following embodiment. In the following, the same parts will be described to be denoted by the same reference numerals.

Parking Lot Support System

First, a parking lot support system 1 according to an embodiment will be described. FIG. 1 is a schematic diagram showing a schematic configuration of the parking lot support system 1 according to this embodiment. The parking lot support system 1 shown in FIG. 1 includes a parking lot management server 10, a plurality of vehicles 20, a base station 30, and a network 40. The parking lot management server 10 and each of the vehicles 20 are configured to be able to perform information communication to each other through the base station 30 and the network 40. Each, of the vehicles 20 is configured to be able to perform mutual information communication between the vehicles 20.

Parking Lot Management Server

First, details of the parking lot management server 10 will be described. The parking lot management server 10 assigns an entrance acceptance number to the vehicle 20 that enters a parking lot 100. The parking lot management server 10 determines the order of the vehicles 20 for supporting (guiding) each of the vehicles 20 that have entered the parking lot 100 to a vacant parking section. The parking lot management server 10 includes a management controller 11, a communication unit 12, and a storage unit 13.

The management controller 11 is configured using, for example, hardware such as a central processing unit (CPU) and a memory. The management controller 11 specifies the license plate of the vehicle 20 that has entered the parking lot 100, by using a well-known template matching or the like, based on image data acquired from an imaging device 101 provided in the parking lot 100 through the network 40. The management controller 11 assigns an entrance acceptance number to the license plate of the specified vehicle 20 and stores it in the storage unit 13. The management controller 11 integratedly controls the respective units configuring the parking lot management server 10. The communication unit 12 transmits a variety of information according to a predetermined communication standard through the network 40 under the control of the management controller 11 and receives a variety of information. The communication unit 12 is configured using a communication module that can be connected to the network 40. The storage unit 13 is configured using a semiconductor memory such as a read only memory (ROM) or a random access memory (RAM), and an external recording device such as a hard disk drive or a solid state drive (SSD). The storage unit 13 stores various programs that are executed by the management controller 11 or various kinds of data that is being processed.

Vehicle

Figure 2:
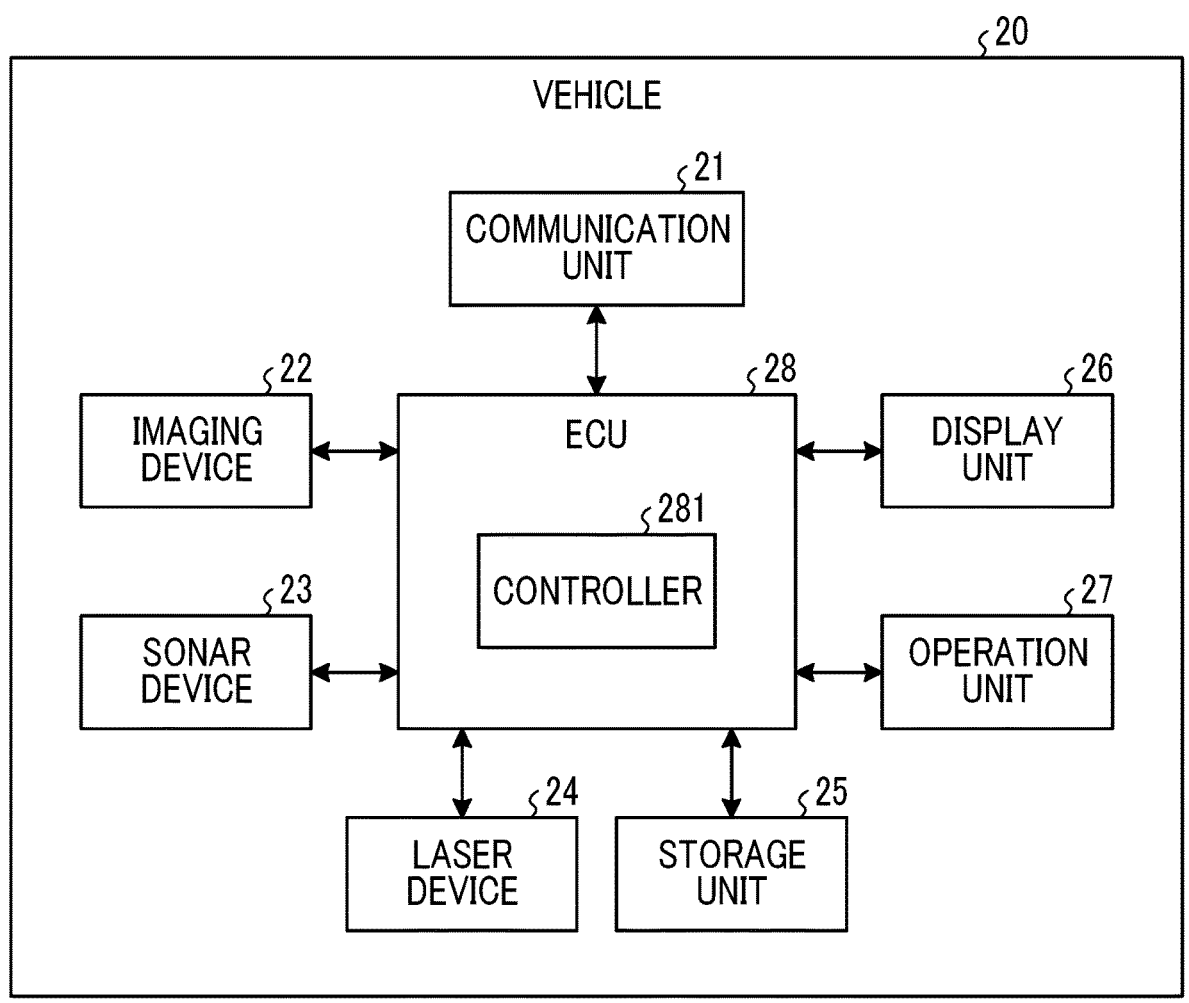
FIG. 2 is a block diagram showing a schematic configuration of a vehicle according to the embodiment.

Next, details of the vehicle 20 will be described. FIG. 2 is a block diagram showing a schematic configuration of the vehicle 20. The vehicle 20 shown in FIG. 2 includes a communication unit 21, an imaging device 22, a sonar device 23, a laser device 24, a storage unit 25, a display unit 26, an operation unit 27, and an electronic control unit (ECU) 28.

The communication unit 21 transmits a variety of information according to a predetermined communication standard through the base station 30 and the network 40 under the control of the ECU 28 and receives a variety of information. The communication unit 21 transmits a variety of information to another vehicle 20, a mobile phone, or the like according to a predetermined communication standard under the control of the ECU 28 and receives a variety of information from another vehicle 20, a mobile phone, or the like. The communication unit 21 is configured using a communication module capable of performing wireless communication.

The imaging device 22 generates moving image data or still image data by photographing the periphery of a host vehicle under the control of the ECU 28 and outputs the moving image data or the still image data to the ECU 28. The imaging device 22 acquires position information stored in a two-dimensional barcode 102 by photographing the two-dimensional barcode 102, for example, a QR code (registered trademark), provided in each parking section of the parking lot 100, and outputs the acquired position information to the ECU 28. The number of floors in the parking lot 100 and the position of the parking section (for example, a parking section number) are included in the position information. The imaging device 22 is configured using an image sensor such as a complementary metal oxide semiconductor (CMOS) or a charge coupled device (CCD), an image processing processor that performs image processing or various controls on the moving image data or the still image data, and the like.

The sonar device 23 emits ultrasonic waves toward the periphery of the host vehicle while scanning the periphery of the host vehicle with the ultrasonic waves under the control of the ECU 28, calculates a reflection distance to a reflection position by receiving the ultrasonic waves reflected by an object, and outputs the reflection distance to the ECU 28. The sonar device 23 is configured using an ultrasonic sensor or the like.

The laser device 24 emits laser light toward the periphery of the host vehicle while scanning the periphery of the host vehicle with the laser light under the control of the ECU 28, calculates a reflection distance to a reflection position by receiving the laser light reflected by an object, and outputs the reflection distance to the ECU 28. The laser device 24 is configured using a laser module or the like.

The storage unit 25 stores various programs that are executed by the ECU 28, and data that is being processed. The storage unit 25 is configured using a semiconductor memory such as a ROM or a RAM, and a recording medium such as an SSD.

The display unit 26 displays a variety of information under the control of the ECU 28. The display unit 26 is configured using a display panel such as liquid crystal or organic electro-luminescence (EL).

The operation unit 27 receives inputs of various operations and outputs signals corresponding to the received operations to the ECU 28. The operation unit 27 is configured using a touch panel, a button, a switch, a cross key, a jog dial, or the like.

The ECU 28 controls each unit configuring the vehicle 20. The ECU 28 is realized by a computer program using a processor having hardware such as a memory and a central processing unit (CPU). The ECU 28 has a controller 281 as a functional part. The controller 281 calculates the size of the parking section in which the host vehicle has been parked, based on the distance to a vehicle (obstacle) adjacent to the host vehicle, and transmits exit information that includes the size of the parking section, position information on the parking section in which the host vehicle has been parked, and the start of exit of the host vehicle, to the first vehicle 20 waiting for entrance, which is a vehicle with the highest priority among transmission targets. Specifically, the controller 281 calculates the size of the parking section in which the host vehicle has been parked, based on the reflection distance that is input from the sonar device 23 or the laser device 24. The controller 281 acquires position information on the parking section in which the host vehicle is to be parked, from the two-dimensional barcode 102 photographed by the imaging device 22. The controller 281 causes the communication unit 21 to transmit exit information that includes the size of the parking section, position information, and the start of exit of the host vehicle, to the first vehicle 20 waiting for entrance, which is a vehicle with the highest priority among transmission targets, notified from the parking lot management server 10. In an embodiment, the ECU 28 functions as a parking lot guidance device.

Processing in Parking Lot Management Server

Figure 3:
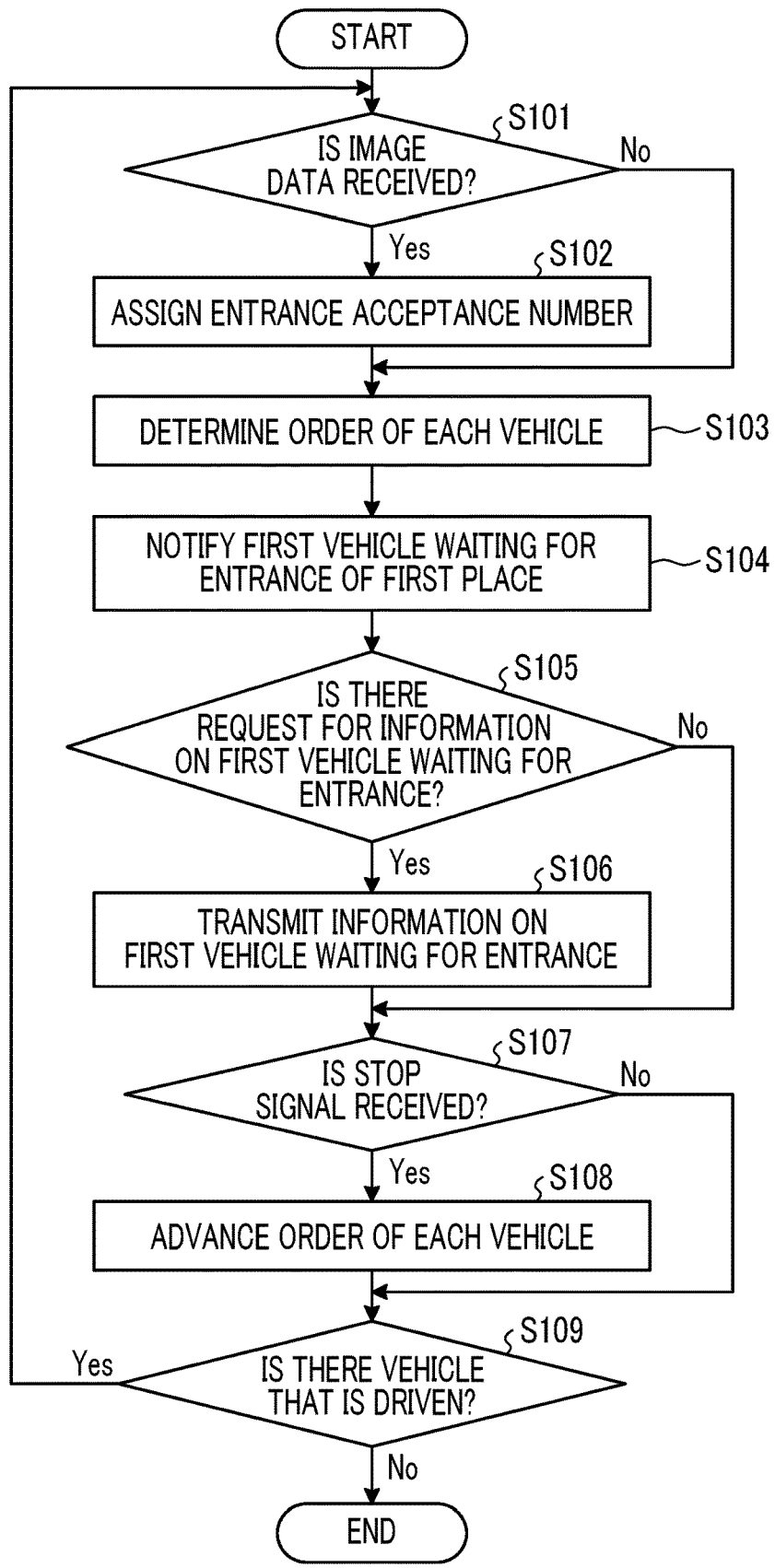
FIG. 3 is a flowchart showing an outline of processing that is executed by a parking lot management server according to the embodiment.

Next, processing that is executed by the parking lot management server 10 will be described. FIG. 3 is a flowchart showing an outline of the processing that is executed by the parking lot management server 10.

As shown in FIG. 3, first, in a case where image data is received from the imaging device 101 of the parking lot 100 (step S101: Yes), the management controller 11 assigns an entrance acceptance number to the license plate of the vehicle 20 that is included in the image data (step S102).

Subsequently, the management controller 11 determines the order of each vehicle 20 that has entered the parking lot 100 from the license plate stored in the storage unit 13 (step S103), and the management controller 11 notifies the first vehicle 20 waiting for entrance, which is a vehicle with the highest priority among transmission targets, of the first place (step S104).

Thereafter, in a case where there is a request for information on the first vehicle waiting for entrance from the vehicle 20 scheduled to exit (step S105: Yes), the management controller 11 transmits the information on the first vehicle waiting for entrance, which is a vehicle with the highest priority among transmission targets, to the vehicle 20 scheduled to exit (step S106).

Subsequently, in a case where a stop signal indicating engine stop is received from the vehicle 20 (step S107: Yes), the management controller 11 advances the entrance vehicle order of each vehicle 20 by deleting the entrance acceptance number of the vehicle 20 from which the stop signal has been received, from the storage unit 13 (step S108).

Thereafter, the management controller 11 determines whether or not there is the vehicle 20 that is being driven in the parking lot 100, based on the license plate of each vehicle 20 stored in the storage unit 13 (step S109). In a case where the management controller 11 determines that there is the vehicle 20 that is being driven in the parking lot 100 (step S109: Yes), the parking lot management server 10 returns to step S101 described above, and in a case where the management controller 11 determines that there is no vehicle 20 that is being driven in the parking lot 100 (step S109: No), the parking lot management server 10 ends this processing.

In step S101, in a case where the image data is not received from the imaging device 101 of the parking lot 100 (step S101: No), the parking lot management server 10 proceeds to step S103.

In step S105, in a case where there is no request for information on the first vehicle waiting for entrance from the vehicle 20 scheduled to exit (step S105: No), the parking lot management server 10 proceeds to step S107.

In step S107, in a case where the stop signal indicating engine stop is not received from the vehicle 20 (step S107: No), the parking lot management server 10 proceeds to step S109.

Processing in Vehicle

Next, processing that is executed by the vehicle 20 will be described. In the following, first, exit processing that is executed by the vehicle 20 (a vehicle 20A in FIG. 1) that exits from the parking section of the parking lot 100 will be described, and then, entrance processing that is executed by the vehicle 20 (a vehicle 20B or a vehicle 20C in FIG. 1) in the parking lot 100 will be described. In FIG. 1, the vehicle 20B is described as being a first vehicle waiting for entrance, and the vehicle 20C is described as being a second vehicle waiting for entrance.

Exit Processing

Figure 4:
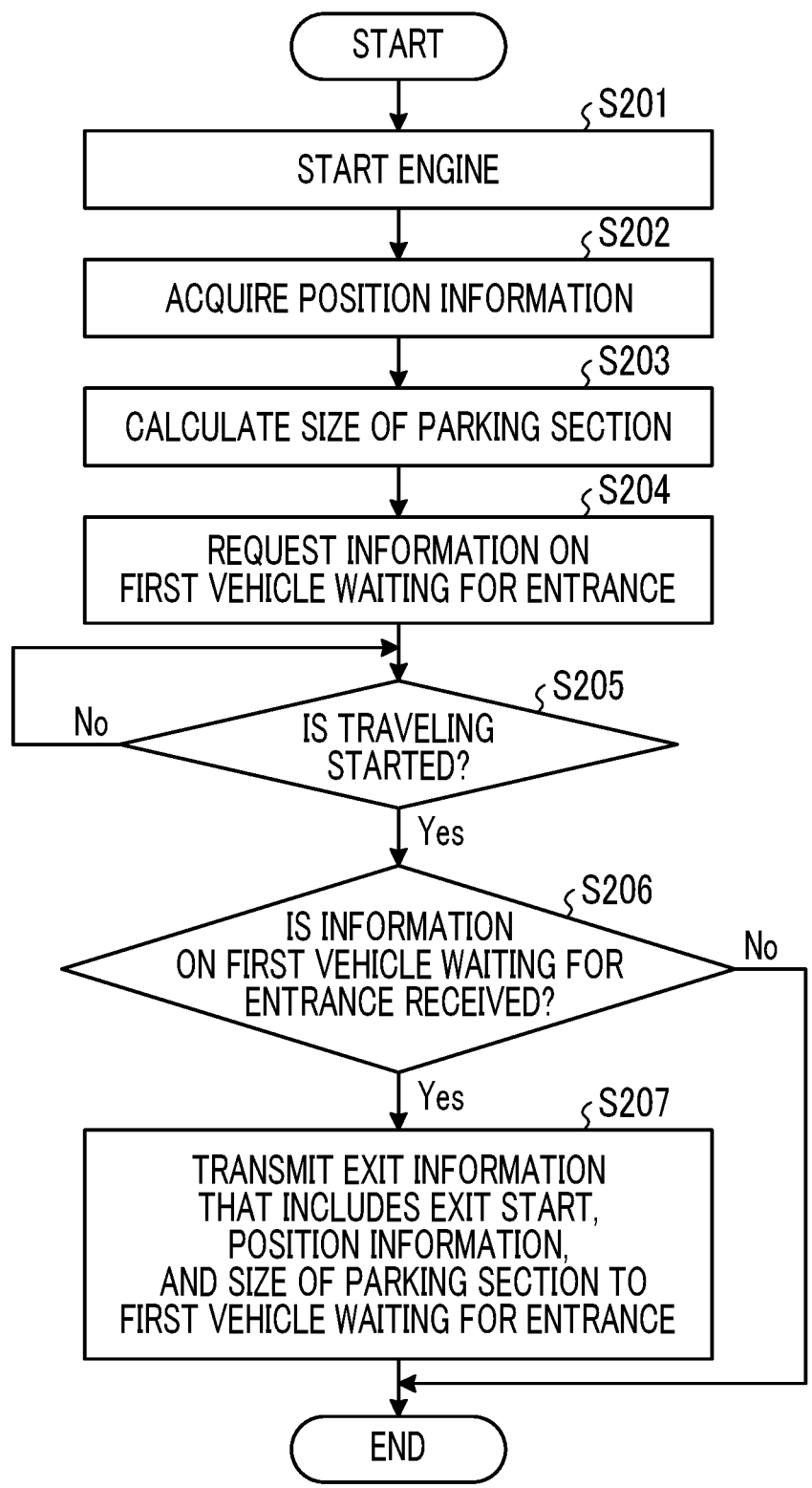
FIG. 4 is a flowchart showing an outline of exit processing that is executed by the vehicle according to the embodiment.

First, the exit processing that is executed by the vehicle 20A will be described. FIG. 4 is a flowchart showing an outline of the exit processing that is executed by the vehicle 20A.

As shown in FIG. 4, first, the vehicle 20A starts an engine in order to exit from the parking section (step S201).

Subsequently, the controller 281 acquires position information on the parking section in which the vehicle 20A has been parked, based on the two-dimensional barcode 102 included in the image data input from the imaging device 22 (step S202), and calculates the size of the parking section from the positional relationship between the vehicles adjacent to each other, based on the reflection distance input from the sonar device 23 or the laser device 24 (step S203). For example, the controller 281 calculates the size (area) of the parking section, based on the size of the host vehicle and the reflection distance. In this way, the actual size of the parking section can be grasped.

Thereafter, the controller 281 requests information on the first vehicle waiting for entrance, which is a vehicle with the highest priority among transmission targets, from the parking lot management server 10 through the communication unit 21 (step S204).

Subsequently, in a case where the vehicle 20A has started traveling (step S205: Yes), when the information on the first vehicle waiting for entrance is received from the parking lot management server 10 (step S206: Yes), the controller 281 causes the communication unit 21 to transmit the exit information that includes the exit start, the position information, and the size of the parking section, to the first vehicle 20B waiting for entrance, which is a vehicle with the highest priority among transmission targets (step S207). In this case, the controller 281 may cause the communication unit 21 to transmit the exit information to the first vehicle 20B waiting for entrance, which is a vehicle with the highest priority among transmission targets, through the base station 30 and the network 40, and may cause the communication unit 21 to transmit the exit information to the first vehicle 20B waiting for entrance, which is a vehicle with the highest priority among transmission targets, through inter-vehicle communication. After step S207, the vehicle 20A ends this processing.

In step S205, in a case where the vehicle 20A has not started traveling (step S205: No), the controller 281 continues this determination.

In step S206, when the information on the first vehicle waiting for entrance is not received from the parking lot management server 10 (step S206: No), the vehicle 20A ends this processing. This situation is a case where the vehicle 20 waiting for entrance does not exist in the parking lot 100.

Entrance Processing

Figure 5:
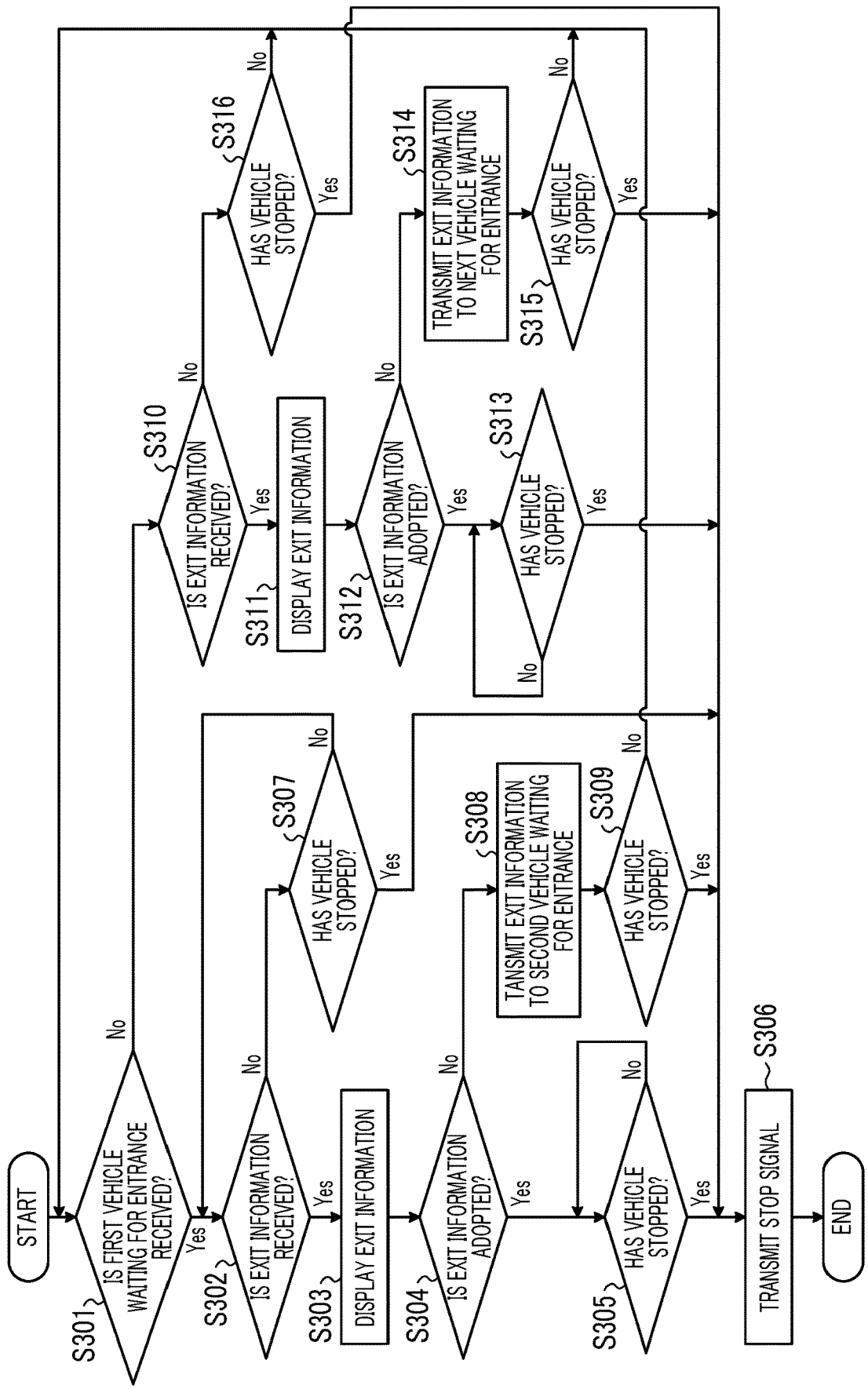
FIG. 5 is a flowchart showing an outline of entrance processing that is executed by the vehicle according to the embodiment.

Next, the entrance processing that is executed by the vehicle 20B or the vehicle 20C will be described. FIG. 5 is a flowchart showing an outline of the entrance processing that is executed by the vehicle 20B or the vehicle 20C.

As shown in FIG. 5, a case where the first vehicle waiting for entrance, which is a vehicle with the highest priority among transmission targets, is received from the parking lot management server 10 through the communication unit 21 (step S301: Yes) will be described. In this case, when the exit information is received from the vehicle 20A through the communication unit 21 (step S302: Yes), the controller 281 causes the display unit 26 to display the exit information received from the vehicle 20A (step S303). In this way, the driver of the vehicle 20B can intuitively determine whether or not it is possible to perform parking in a vacant parking section, without going to the parking section from which the vehicle 20A has exited, based on the position information and the size of the parking section that are included in the exit information that is displayed by the display unit 26.

Subsequently, in a case where an instruction signal to adopt the exit information is input from the operation unit 27 (step S304: Yes), when the vehicle 20B has stopped (step S305: Yes), the controller 281 causes the communication unit 21 to transmit a stop signal indicating that the vehicle 20B has stopped an engine due to entry into the parking section, to the parking lot management server 10 (step S306). After step S306, the vehicle 20B ends this processing.

In step S305, when the vehicle 20B is not stopped (step S305: No), the controller 281 continues the determination of step S305.

In step S304, in a case where the instruction signal to adopt the exit information is not input from the operation unit 27 (step S304: No), the controller 281 causes the communication unit 21 to transmit the exit information received from the vehicle 20A to the second vehicle 20 (20C in FIG. 1) waiting for entrance, through inter-vehicle communication (step S308).

Subsequently, in a case where the vehicle 20B has stopped (step S309: Yes), the controller 281 proceeds to step S306. This situation is a case where the driver of the vehicle 20B has parked the vehicle 20B in the parking section that the driver himself has found.

In step S302, when the exit information is not received from the vehicle 20A through the communication unit 21 (step S302: No), the controller 281 proceeds to step S307 which will be described later.

Subsequently, in a case where the vehicle 20B has stopped (step S307: Yes), the controller 281 proceeds to step S306. In contrast, in a case where the vehicle 20B has not stopped (step S307: No), the controller 281 returns to step S302 described above.

In step S309, in a case where the vehicle 20B has not stopped (step S309: No), the controller 281 returns to step S301 described above.

A case where the first vehicle waiting for entrance is not received from the parking lot management server 10 through the communication unit 21 in step S301 (step S301: No) will be described. In this case, when the exit information is received from the vehicle 20A through the communication unit 21 (step S310: Yes), the controller 281 causes the display unit 26 to display the exit information received from the vehicle 20A (step S311). This situation is a case where the driver of the first vehicle 20B waiting for entrance has not adopted a vacant parking section that is included in the exit information. That is, as the vehicle 20, the second vehicle 20C waiting for entrance is assumed.

Subsequently, in a case where the instruction signal to adopt the exit information is input from the operation unit 27 (step S312: Yes), when the vehicle 20C has stopped (step S313: Yes), the controller 281 proceeds to step S306.

In step S313, when the vehicle 20C has not stopped (step S313: No), the controller 281 continues the determination of step S313.

In step S312, in a case where the instruction signal to adopt the exit information is not input from the operation unit 27 (step S312: No), the controller 281 causes the communication unit 21 to transmit the exit information to the next vehicle 20 (for example, a vehicle 20D in FIG. 1) waiting for entrance through the inter-vehicle communication (step S314). In this manner, in an embodiment, transmission is performed between the vehicles 20 in a sequential relay format by the inter-vehicle communication until the exit information is adopted.

Subsequently, in a case where the vehicle 20B has stopped (step S315: Yes), the controller 281 proceeds to step S306, and in a case where the vehicle 20B has not stopped (step S315: No), the controller 281 returns to step S301 described above.

In step S310, when the exit information is not received from the vehicle 20A through the communication unit 21 (step S310: No), the controller 281 proceeds to step S316 which will be described later.

Subsequently, in a case where the vehicle 20B has stopped (step S316: Yes), the vehicle 20B proceeds to step S306. In contrast, in a case where vehicle 20B has not stopped (Step S316: No), the controller 281 returns to Step S301 described above.

According to the embodiment described above, the controller 281 causes the communication unit 21 to transmit the exit information that includes the size of the parking section in which the host vehicle (the vehicle 20A) has been parked, the position information on the parking section in which the host vehicle has been parked, and the start of exit of the host vehicle to the first vehicle 20 (the vehicle 20B) waiting for entrance, which is a vehicle with the highest priority among transmission targets, and therefore, the driver of the vehicle 20 waiting for entrance can grasp in advance the size of the parking section to be parked.

According to the embodiment, the controller 281 calculates the size of the parking section, based on the distance to an obstacle, for example, the vehicle 20, adjacent to the host vehicle, and therefore, when transmission is made to the vehicle 20 with the highest priority among transmission targets, the driver can grasp the actual size of the parking section.

According to the embodiment, in a case where the controller 281 has received the exit information from another vehicle 20A, when the instruction signal to adopt the exit information is not input, the exit information received from another vehicle 20A is transmitted to the vehicle 20C with the next priority among transmission targets through the inter-vehicle communication, and therefore, transmission can be performed between the vehicles in a sequential relay format by the inter-vehicle communication until the exit information is adopted.

According to the embodiment, in a case where the controller 281 has received the exit information received from another vehicle 20A, the controller 281 causes the display unit 26 to display the exit information received from another vehicle 20A, and therefore, the driver can intuitively determine whether or not it is possible to perform parking in a vacant parking section.

In the embodiment described above, the imaging device 22 photographs the two-dimensional barcode 102, whereby position information stored in the two-dimensional barcode 102 is acquired. However, there is no limitation thereto, and an IC tag capable of performing wireless communication, for example, a radio frequency identifier (RFID) or the like may be used. In this case, a reader or the like for acquiring information from the IC tag may be provided instead of the imaging device 22.

In the parking lot support system according to the embodiment described above, the "unit" described above can be read as "means", "circuit", or the like. For example, the controller can be read as control means or a control circuit.

The program to be executed by the parking lot support system according to the embodiment described above is provided with it recorded in a computer readable recording medium such as a CD-ROM, a flexible disk (FD), a CD-R, a digital versatile disk (DVD), a USB medium, or a flash memory, as file data in an installable format or an executable format.

The program to be executed by the parking lot support system according to the embodiment described above may be configured to be stored in a computer connected to a network such as the Internet and provided by being downloaded via the network.

In the description of the flowchart in this specification, the context of the processing between the steps is specified using expressions such as "first", "thereafter", and "subsequently". However, the order of processing needed to carry out the disclosure is not uniquely defined by these expressions. That is, the order of the processing in the flowchart described in this specification can be changed without contradiction.

Additional effects or modifications can be easily derived by those skilled in the art. The broader aspects of the disclosure are not limited to the specific details and representative embodiments represented and described above. Therefore, various modifications may be made without departing from the spirit or scope of the general concept of the disclosure, which is defined by the appended claims and their equivalents.

What is claimed is:

1. A parking lot guidance device comprising a processor, wherein the processor is configured to cause a communication unit to transmit exit information to a vehicle with a highest priority among other vehicles that are transmission targets, the exit information including information of a size of a parking section in which a host vehicle is parked, information of a position of the parking section in which the host vehicle is parked, and information of a start of exit of the host vehicle, and
wherein the processor is configured to calculate the size of the parking section in which the host vehicle is parked, based on a distance to a vehicle that is parked adjacent to the host vehicle.

2. The parking lot guidance device according to claim 1, wherein the processor is configured to calculate the size of the parking section, based on a distance to an obstacle adjacent to the host vehicle.

3. The parking lot guidance device according to claim 1, wherein the processor is configured to, in a case where the processor receives other exit information from another vehicle, transmit the other exit information received from the other vehicle to a vehicle with next priority among the other vehicles that are transmission targets, when an instruction signal to adopt the other exit information is not input.

4. The parking lot guidance device according to claim 3, wherein the processor is configured to cause a display device to display the other exit information received from the other vehicle, in a case where the processor receives the other exit information from the other vehicle.

5. A parking lot guidance device comprising a processor, wherein the processor is configured to cause a communication unit to transmit exit information to a vehicle with a highest priority among other vehicles that are transmission targets, the exit information including information of a size of a parking section in which a host vehicle is parked, information of a position of the parking section in which the host vehicle is parked, and information of a start of exit of the host vehicle, and
wherein the processor is configured to calculate the size of the parking section in which the host vehicle is parked, based on a first distance to a first vehicle that is parked adjacent to the host vehicle on a left side of the host vehicle, and a second distance to a second vehicle that is parked adjacent to the host vehicle on a right side of the host vehicle.

6. A parking lot guidance device comprising a processor, wherein the processor is configured to cause a communication unit to transmit exit information to a vehicle with a highest priority among other vehicles that are transmission targets, the exit information including information of a size of a parking section in which a host vehicle is parked, information of a position of the parking section in which the host vehicle is parked, and information of a start of exit of the host vehicle, and
wherein the processor is configured to calculate the size of the parking section in which the host vehicle is parked, based on a reflection distance that is input from a sonar device or a laser device of the host vehicle.

7. The parking lot guidance device according to claim 6, wherein the processor is configured to calculate the size of the parking section in which the host vehicle is parked, based on a size of the host vehicle and the reflection distance.

* * * * *